(12) United States Patent
Hyon et al.

(10) Patent No.: US 7,876,733 B2
(45) Date of Patent: Jan. 25, 2011

(54) METHOD AND APPARATUS FOR COMMUNICATING BY USE OF RELAYING SYSTEM IN A COGNITIVE RADIO TECHNIQUE

(75) Inventors: Tae In Hyon, Hwaseong-si (KR); Jae Myoung Kim, Seoul (KR); Jae Hak Chung, Seoul (KR); Sang Jo Yoo, Incheon (KR); Young Gun Ji, Gwangmyeong-si (KR)

(73) Assignees: Samsung Electronics Co., Ltd., Suwon-si (KR); Inha-Industry Partnership Institute, Incheon (KR)

( * ) Notice: Subject to any disclaimer, the term of this patent is extended or adjusted under 35 U.S.C. 154(b) by 766 days.

(21) Appl. No.: 11/853,348

(22) Filed: Sep. 11, 2007

(65) Prior Publication Data

US 2008/0170603 A1      Jul. 17, 2008

(30) Foreign Application Priority Data

Jan. 11, 2007    (KR) ...................... 10-2007-0003471

(51) Int. Cl.
*H04B 7/216* (2006.01)
(52) U.S. Cl. ...................................... 370/335
(58) Field of Classification Search ......... 370/328–339, 370/400–401
See application file for complete search history.

(56) References Cited

U.S. PATENT DOCUMENTS 7,558,293 B2 *   7/2009   Choi et al. .................. 370/509
2007/0274275 A1 *  11/2007  Laroia et al. ................ 370/338

OTHER PUBLICATIONS

Devroye et al, Limits on Communications in a Cognitive Radio Channel, IEEE, 6 pages, 2006.*
IEEE P802.22, A PHY/MAC Proposal for IEEE 802.22 WRAN Systems Part 2: The Cognitive MAC, IEEE, 220 pages, Mar. 2006.*

* cited by examiner

*Primary Examiner*—Frank Duong
(74) *Attorney, Agent, or Firm*—NSIP Law

(57) ABSTRACT

A communication method and apparatus of a cognitive radio (CR) environment using a relaying system while not interfering with a communication system having a priority right to use a frequency band, the communication method including: listening to fundamental channel (FCH) information and/or downlink/uplink (DL/UL) map information of a frame transmitted in the relaying system; obtaining a transmission signal of the relaying system using the FCH information and/or the DL/UL map information; orthogonally encoding data to be transmitted in the CR environment based on the obtained transmission signal; and transmitting the orthogonally encoded data via a determined channel that is used in the relaying system. Accordingly, aspects of the present invention can retrieve radio resources unused in the CR environment more easily.

36 Claims, 10 Drawing Sheets

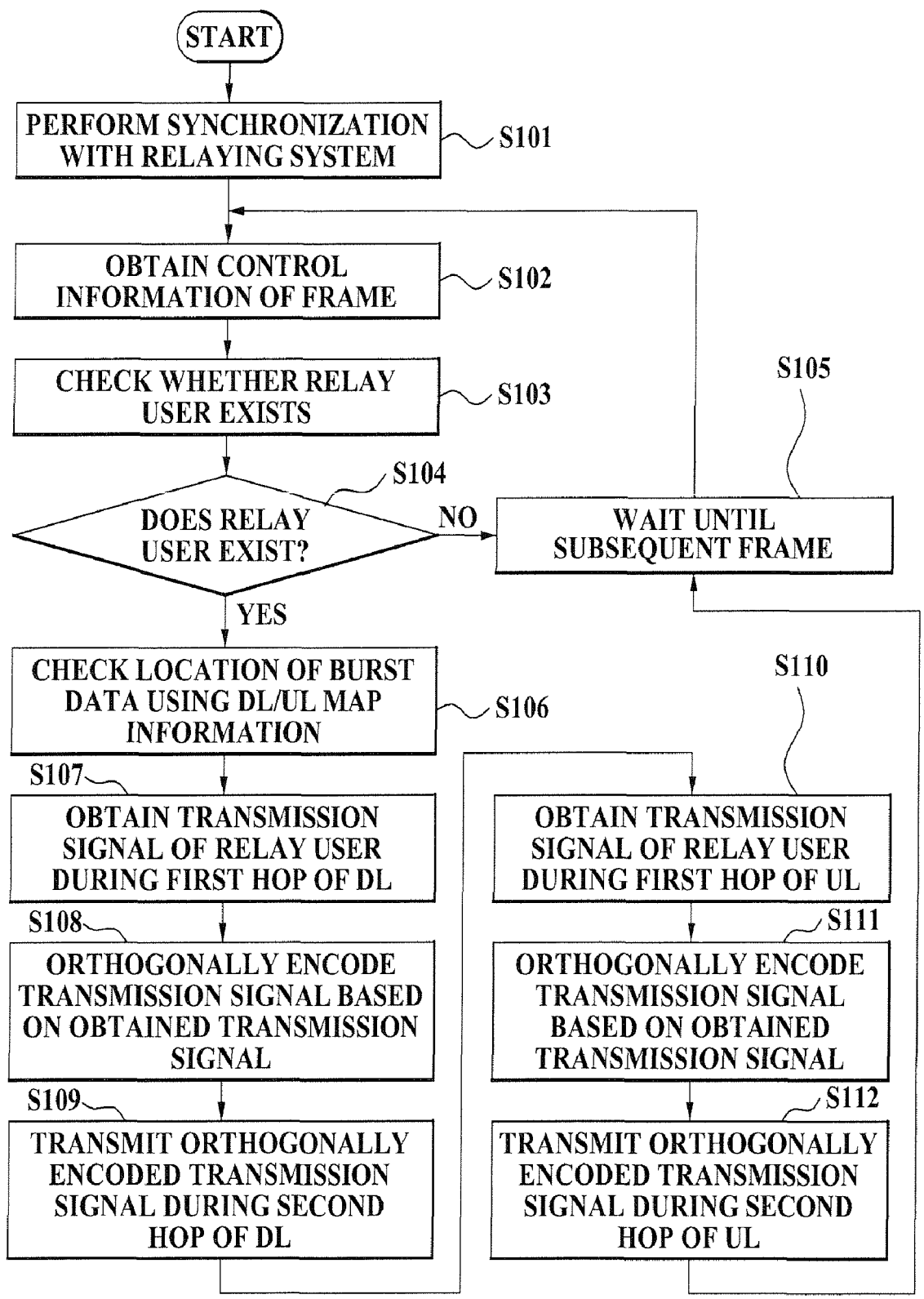

⇒ :DOWNLINK BURST DATA TRANSMISSION
→ :DOWNLINK COGNITIVE TRANSMISSION
----► :ACQUISITION OF CONTROL INFORMATION AND DOWNLINK BURST DATA

<DOWNLINK COGNITIVE TRANSMISSION>

FIG. 3
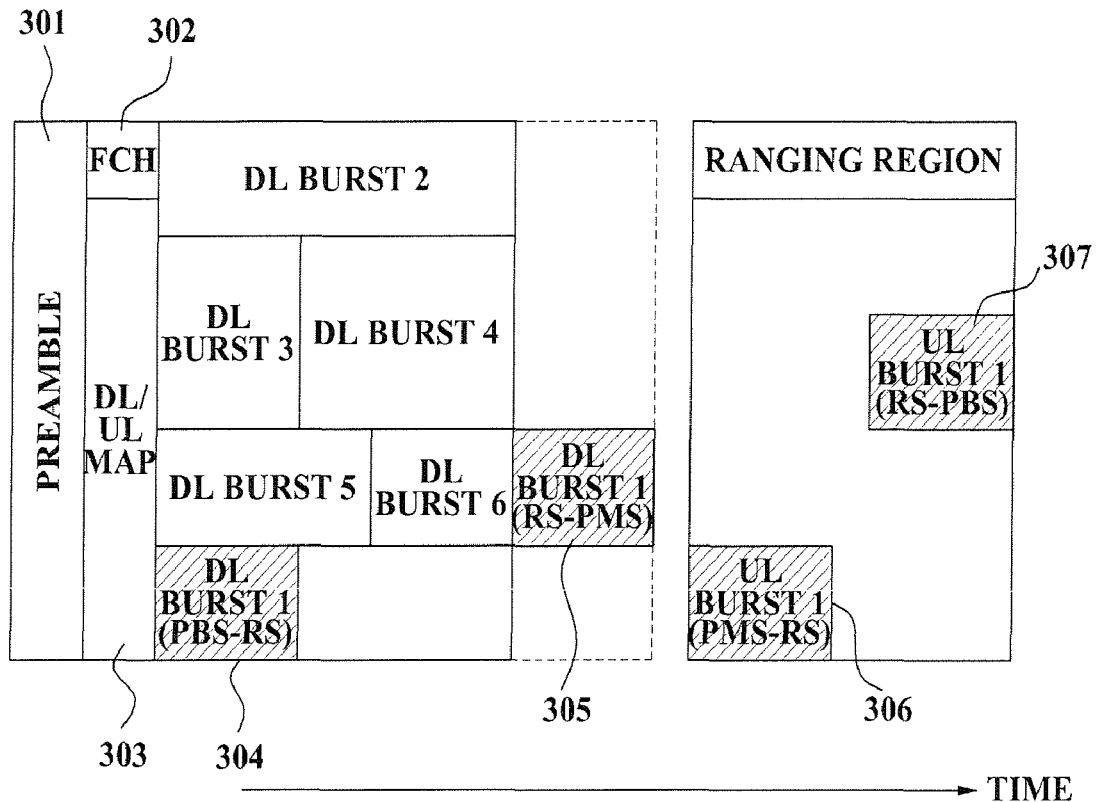
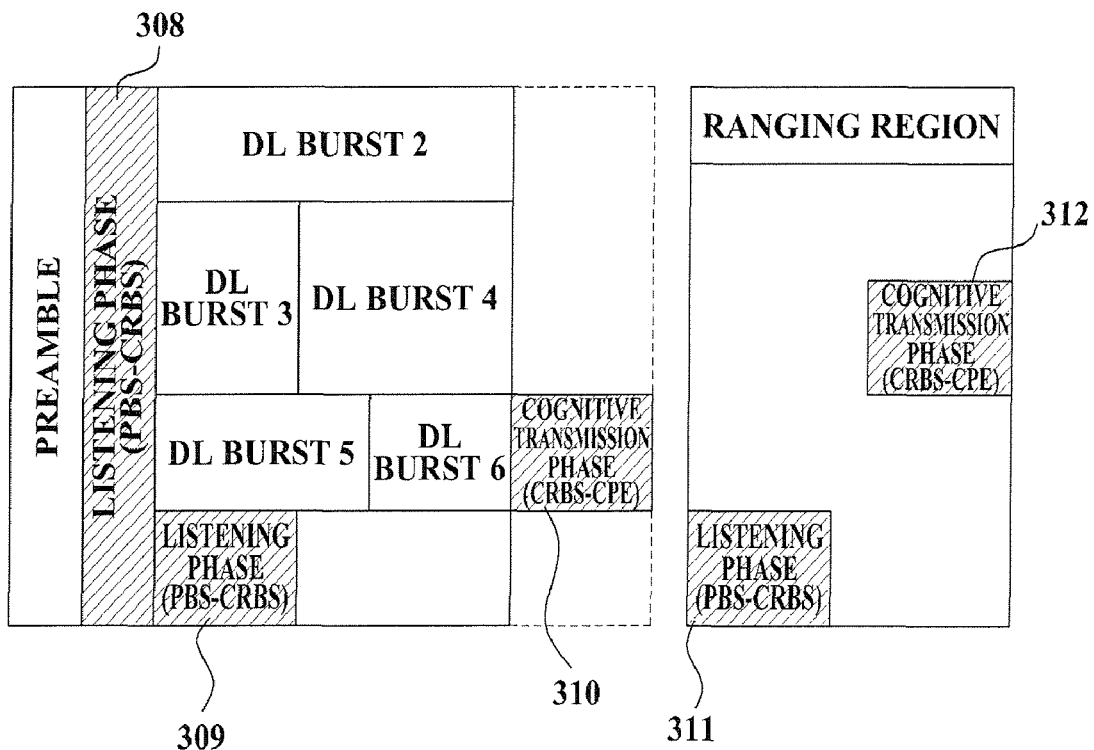

<DOWNLINK COGNITIVE TRANSMISSION>

<UPLINK COGNITIVE TRANSMISSION>

METHOD AND APPARATUS FOR COMMUNICATING BY USE OF RELAYING SYSTEM IN A COGNITIVE RADIO TECHNIQUE

CROSS-REFERENCE TO RELATED APPLICATION

This application claims the benefit of Korean Patent Application No. 2007-3471, filed Jan. 11, 2007 in the Korean Intellectual Property Office, the disclosure of which is incorporated herein by reference.

BACKGROUND OF THE INVENTION

1. Field of the Invention

Aspects of the present invention relate to a relaying system, and more particularly, to a communication method and apparatus of a cognitive radio (CR) environment using a relaying system.

2. Description of the Related Art

Due to the rapid development of various wireless communication technologies, usable frequency bands are in a state of being almost completely allocated. In particular, since frequencies of low frequency bands are already assigned to other commercial systems, newly-entering systems must consider using a high frequency band. Research on various methods to solve poor characteristics of the high frequency band is underway.

Cognitive radio (CR) technology is currently being investigated to overcome such radio resource shortages. In CR technology, radio resources with low utilization ratios are identified and then shared without interfering with systems that use existing assigned frequencies. Accordingly, radio resource efficiencies are theoretically improved.

Cost efficiency is one of the advantages of CR technologies. Specifically, compared to existing wireless communication services, CR technologies are relatively low priced by using wireless frequency bands with no charge. CR technologies are related to the management and distribution of wireless channels with respect to multi-channels and to interference detection technologies, which may be interoperable with next generation wireless communication. As an example, CR technologies may efficiently transmit high speed data in dead zones without generating frequency interferences. In this instance, the dead zones are created in cellular environments or rural areas that require improved cell sizes.

However, a communication method and apparatus of a conventional CR environment have the following disadvantages. First, a long period of time is needed to retrieve a usable frequency band from among many frequency bands in order to perfectly apply the CR technology. Furthermore, complex problems arise in retrieving the usable frequency band. Second, when the usable frequency band is retrieved, constantly sensing whether a user having a priority exists is required in order to perfectly apply the CR technology. This sensing is time-consuming, and involves a complex algorithm. Therefore, a communication method and apparatus of a CR environment using a relaying system is needed.

SUMMARY OF THE INVENTION

Aspects of the present invention provide a communication method and apparatus of a cognitive radio (CR) environment using a relaying system, which can secure radio resources that can be used more stably without retrieving an extensive frequency band in order to retrieve a usable frequency band in a CR environment. Also, aspects of the present invention can be applied to other technologies in which retrieving the CR environment and the extensive frequency band and securing radio resources are needed.

Aspects of the present invention also provide a communication method and apparatus of a CR environment using a relaying system, which can share radio resources without constantly checking whether a user having a priority exists.

According to an aspect of the present invention, there is provided a communication method of a CR environment using a relaying system, the method including: listening to fundamental channel (FCH) information and/or downlink/uplink (DL/UL) map information of a frame transmitted in the relaying system; obtaining a transmission signal of the relaying system using the FCH information and/or the DL/UL map information; orthogonally encoding data to be transmitted in the CR environment based on the obtained transmission signal; and transmitting the orthogonally encoded data via a determined channel that is used in the relaying system.

According to another aspect of the present invention, there is provided a communication method of a CR environment using a relaying system, the method including: listening to FCH information and channel quality information (CQI) of a frame transmitted in the relaying system; calculating, using the CQI, a cell radius and transmission power for the CR environment such that the CR environment causes only a permissible interference in the relaying system; detecting a customer premises equipment (CPE) located in the calculated cell radius; and controlling a base station of the CR environment to perform a communication with the detected CPE using the calculated transmission power.

According to still another aspect of the present invention, there is provided a communication apparatus of a CR environment using a relaying system, the apparatus including: a listening unit to listen to FCH information and/or DL/UL map information of a frame transmitted in the relaying system; a receiving unit to obtain a transmission signal of the relaying system using the FCH information and/or the DL/UL map information; an encoding unit to orthogonally encode data to be transmitted in the CR environment based on the obtained transmission signal; and a transmitting unit to transmit the orthogonally encoded data via a determined channel that is used in the relaying system.

According to yet another aspect of the present invention, there is provided a communication apparatus of a CR environment using a relaying system, the apparatus including: a listening unit to listen to FCH information and CQI of a frame transmitted in the relaying system; a calculating unit to calculate, using the CQI, a cell radius and transmission power for the CR environment such that the CR environment causes only an acceptable interference in the relaying system; a detecting unit to detect a CPE located in the calculated cell radius; and a controlling unit to perform a communication with the detected CPE using the calculated transmission power.

According to another aspect of the present invention, there is provided a communication method of a cognitive radio (CR) environment using a relaying system, the method including: obtaining control information of a frame transmitted in the relaying system; and modifying and/or transmitting data of the CR environment via a predetermined channel that is used in the relaying system according to the control information of the frame.

According to another aspect of the present invention, there is provided a communication apparatus of a cognitive radio (CR) environment using a relaying system, the apparatus including: a listening unit to obtain control information of a frame transmitted in the relaying system; a receiving unit to obtain a transmission signal of the relaying system using the control information; and an encoding unit to orthogonally encode data to be transmitted in the CR environment based on the obtained transmission signal.

According to another aspect of the present invention, there is provided a communication apparatus of a cognitive radio (CR) environment using a relaying system, the apparatus including: a listening unit to obtain control information of a frame transmitted in the relaying system; and a calculating unit to calculate, using the control information, a cell radius and/or transmission power for the CR environment, such that the CR environment causes only an acceptable interference in the relaying system.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a flowchart illustrating a communication method of a cognitive radio (CR) environment using a relaying system according to an embodiment of the present invention;

FIG. 3 is a diagram illustrating a structure of a frame according to an embodiment of the present invention;

DETAILED DESCRIPTION OF THE EMBODIMENTS

Figure 2A:
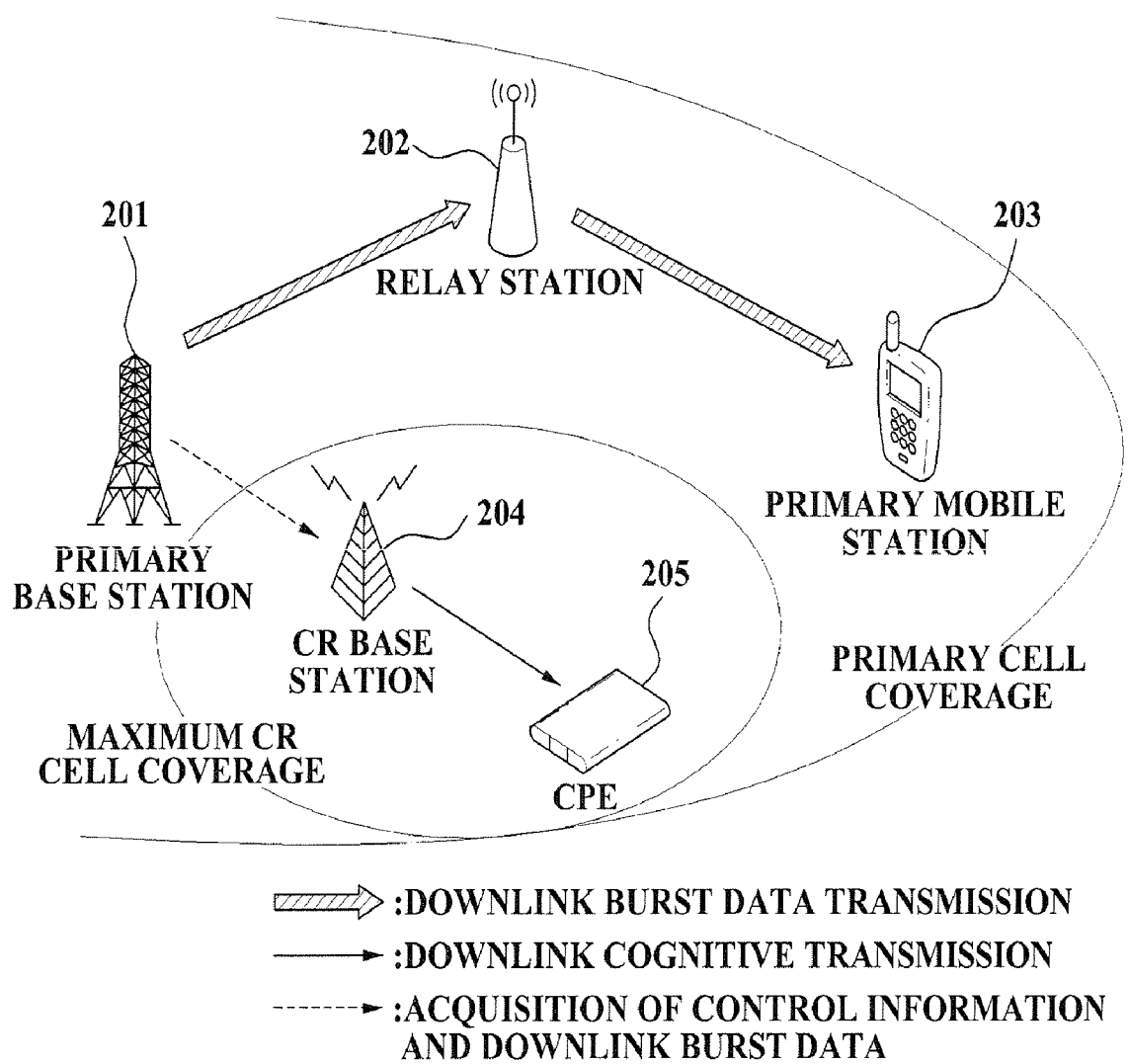
FIG. 2A is a diagram illustrating an apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide a technology of sharing a radio resource between a relaying system and a cognitive radio (CR) technology system. Specifically, the CR technology system obtains control information of the relaying system in order to improve a usage efficiency of the radio resource.

According to an aspect of the present invention, the CR technology system transmits data extending over two hops via a relay station. Furthermore, the CR technology system obtains a transmission signal of the relaying system, and performs orthogonal encoding. Therefore, the CR technology system uses a determined channel that is used in the relaying system.

According to another aspect of the present invention, the CR technology system obtains channel quality information (CQI) of a relaying system and controls power of the CR technology system to transmit data with a transmission power causing a permissible interference.

A relaying system is a system to which a unique and specific frequency band is allocated, and which performs a relaying wireless communication. A CR system is a communication system that uses CR technology. The CR system can also be referred to as a CR environment. A downlink (DL) is a transmission direction from a base station to a terminal, and an uplink (UL) is a transmission direction from a terminal to a base station. The terminal is an apparatus that can wirelessly communicate, such as a mobile phone. A relay is an apparatus that receives a transmission signal and retransmits the signal to a receiving side in order to smoothly transmit a signal in a wireless communication system. A number of hops is a number of wireless links passed through during a process in which a transmitting side transmits any signal to the receiving side (i.e., a final destination).

Furthermore, a primary base station (PBS) is a base station of the relaying system that has a priority right to use a frequency band. A CR base station (CRBS) is a base station of the CR technology system. A relay station (RS) is an apparatus in which a transmission signal is transmitted from a relaying base station, and which retransmits the transmission signal to a terminal of the relaying system in order to smoothly transmit a signal of the relaying system. A primary mobile station (PMS) is a terminal of the relaying system that has a priority right to use a frequency. A relay user is a user to which data is transmitted via a relay in the relaying system.

Moreover, a listening phase (LP) is an operation of receiving a transmission signal of the relaying system so that a CR system may obtain control information (such as fundamental channel (FCH) information, DL/UL map information, etc.), data information, channel quality information, and the like of the relaying system. A cognitive transmission phase (CTP) is an operation in which the CR system shares radio resource with the relaying system, and simultaneously transmits data. Orthogonal encoding is an encoding process of minimizing interference of data to be transmitted, based on data obtained without causality. For example, the orthogonal encoding can be a dirty paper coding method, a superposition coding method, etc. Primary cell coverage is cell coverage of the relaying system having a priority right to use a frequency band. Maximum CR cell coverage is cell coverage of the CR system restricted due to an interference phenomenon with an adjacent cell of the relaying system. Also, available CR cell coverage is cell coverage to which the CR system can transmit data in a range of interference that a transmission signal of the relaying system can accept.

FIG. 1 is a flowchart illustrating a communication method of a CR environment using a relaying system according to an embodiment of the present invention. As illustrated in FIG. 1, a CRBS and/or a customer premises equipment (CPE) performs synchronization with a relaying system in order to transmit data while sharing radio resources with the relaying system in operation S101. The CRBS and/or the CPE includes a module to perform synchronization with the relaying system. The CPE may be an apparatus that is installed in customer premises, and enables a user apparatus and a device (such as a telephone, various data terminal equipments, a main computer, a multiplexer (MUX), a private branch exchange (PBX), etc.) to be connected to and use a transmission channel of a public communication service.

After the performing of the synchronization (operation S101), a transmission frame of the relaying system transmitted from a PBS is received and control information is obtained therefrom in operation S102. The control information includes, for example, FCH information, DL/UL map information, etc.

Using the obtained control information, it is checked whether a relay user, to which data is being transmitted using an RS, exists from among users of a PBS for sharing radio resources in operation S103. Specifically, aspects of the present invention use a structural characteristic of a transmission frame of the relaying system. Then, according to the checked result (operation S103), it is determined whether the relay user exists in operation S104.

When the relay user does not exist (operation S104), a subsequent frame is used to recheck whether the relay user exists in operation S105. With the subsequent frame, the operations of obtaining control information (operation S102) and checking if the relay user exists therefrom (operation S103) are performed. If it is determined that the relay user does not exist, the operations of using a subsequent frame (operation S105), obtaining control information from the subsequent frame (operation S102), and checking whether the relay user exists (operation S103) are performed again. However, it is understood that according to other aspects, a subsequent frame is not used to recheck if the relay user exists and the method ends when it is determined that the relay user does not exist (operation S104). Conversely, when the relay user exists (operation S104), a location of DL/UL burst data of the relay user is checked using DL/UL map information of the corresponding relay user from the obtained control information in operation S106. It is understood that the burst data is just an example, and can be replaced with another signal or type of data according to other aspects of the present invention.

The CRBS obtains a transmission signal of the relay user during a first hop while transmitting DL data of the relay user in operation S107. Specifically, the transmission signal can indicate DL burst data or UL burst data. The CRBS orthogonally encodes data to be transmitted by the CRBS based on the obtained DL burst data of the relay user in operation S108. Also, the CRBS and the CPE can decode and encode the data based on a channel encoding method of burst data of the relaying system.

The CRBS transmits the orthogonally encoded data during a second hop while transmitting DL data of the relay user in operation S109. Therefore, the CR system transmits a signal without an interference phenomenon although the CR system uses a determined channel of the relaying system.

Next, or alternatively to the obtaining of the transmission signal of the relay user during a DL, the CPE obtains UL burst data of the relay user during a first hop of an UL of the relay user in operation S110. It is understood that the burst data is just an example, and can be replaced with another signal according to other aspects of the present invention. The CPE orthogonally encodes data to be transmitted by the CPE based on the obtained UL burst data of the relay user in operation S111.

Furthermore, the CPE transmits the orthogonally encoded data during a second hop of the UL of the relay user without any interference phenomenon in operation S112. The CRBS and the CPE performing the above process wait until a subsequent frame in operation S105, and perform the above operations again in order to obtain the control information of the subsequent frame from the PBS.

FIG. 2A is a diagram illustrating an apparatus according to an embodiment of the present invention. Referring to FIG. 2A, a signal flow in which a CR system shares radio resources of a relaying system during a DL process is described. As illustrated in FIG. 2A, the relaying system includes a PBS 201, an RS 202, and a PMS 203. The CR system includes a CRBS 204 and a CPE 205.

During a first hop in which data is transmitted from the PBS 201 to the RS 202, the CRBS 204 receives a frame of the relaying system via a wireless channel between the PBS 201 and the CRBS 204. The CRBS 204 checks whether a relay user exists by obtaining control information from the received frame. When the relay user exists, a location of DL burst data and UL burst data of the relaying user is checked using DL/UL map information of the frame.

The CRBS 204 then obtains the DL burst data of the relay user during a first hop in which the DL burst data of the relay user is transmitted. The CRBS 204 orthogonally encodes data to be transmitted from the CRBS 204 to the CPE 205 based on the obtained DL burst data of the relay user.

Then, during a second hop in which the DL burst data of the relay user is transmitted via a wireless channel between the RS 202 and the PMS 203, the CRBS 204 transmits the orthogonally encoded data via a wireless channel between the CRBS 204 and the CPE 205.

Figure 2B:
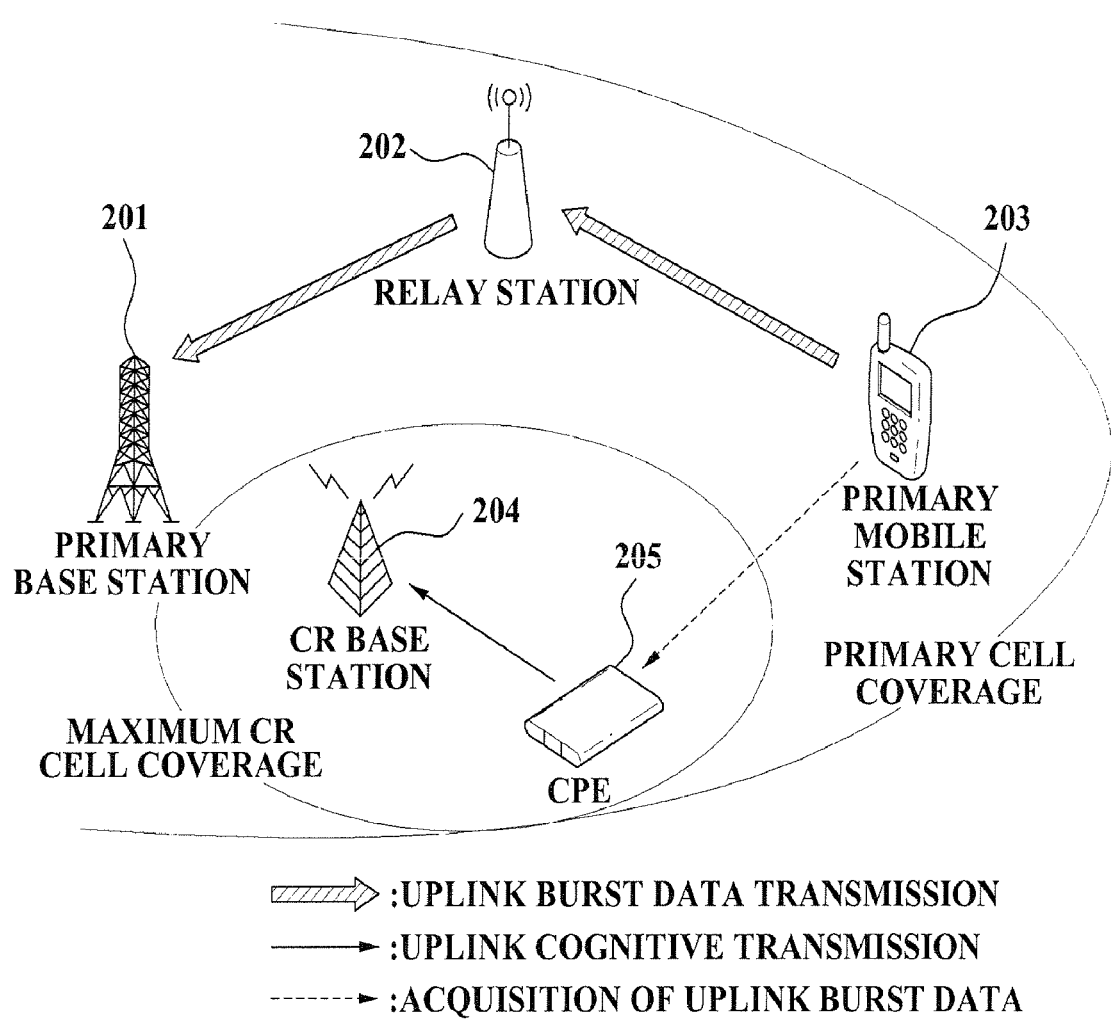
FIG. 2B is a diagram illustrating another apparatus according to an embodiment of the present invention.

FIG. 2B is a diagram illustrating another apparatus according to an embodiment of the present invention. Referring to FIG. 2B, a signal flow in which a CR system shares radio resource of a relaying system during a UL process is described. As illustrated in FIG. 2B, during a first hop in which UL burst data of a relay user is transmitted via a wireless channel between a PMS 203 and an RS 202, a CPE 205 obtains UL burst data of the relay user. The CPE 205 orthogonally encodes data to be transmitted from the CPE 205 to a CRBS 204 based on the obtained UL burst data of the relay user.

Then, during a second hop in which the DL burst data of the relay user is transmitted from the RS 202 to a PBS 201, the CPE transmits the orthogonally encoded data via a wireless channel between the CPE 205 and the CRBS 204 without interference.

FIG. 3 is a diagram illustrating a structure of a frame according to an embodiment of the present invention. Referring to FIG. 3, a process in which a frame for each DL/UL obtains control information and data, and a process in which a frame for each DL/UL link transmits data using orthogonal encoding are described.

First, an operation in a DL is described as follows. A CRBS performs synchronization with a relaying system using a preamble 301 of a frame. Next, the CRBS performs an LP 308 in order to obtain control information 302 and 303. The CRBS then checks whether a relay user exists using the obtained control information.

When the relay user exists, the CRBS checks a location of burst data for each DL/UL of the relay user using DL/UL map information 303 of the relay user. The CRBS performs an LP 309 during a first hop of the relay user in order to obtain DL burst data 304 of the relay user. The CRBS orthogonally encodes data to be transmitted based on the obtained DL burst data of the relay user. Then, the CRBS performs a CTP 310 in order to transmit the orthogonally encoded data during a second hop of the relay user without interference with DL burst data 305 of the relay user.

An operation in a UL is described as follows. A CPE performs an LP 311 during a first hop of the relay user in order to obtain UL burst data 306 of the relay user. The CPE then orthogonally encodes data to be transmitted based on the obtained UL burst data. The CPE performs a CTP 312 in order to transmit the orthogonally encoded data during a second hop of the relay user without interference with UL burst data 307 of the relay user.

Figure 7A:
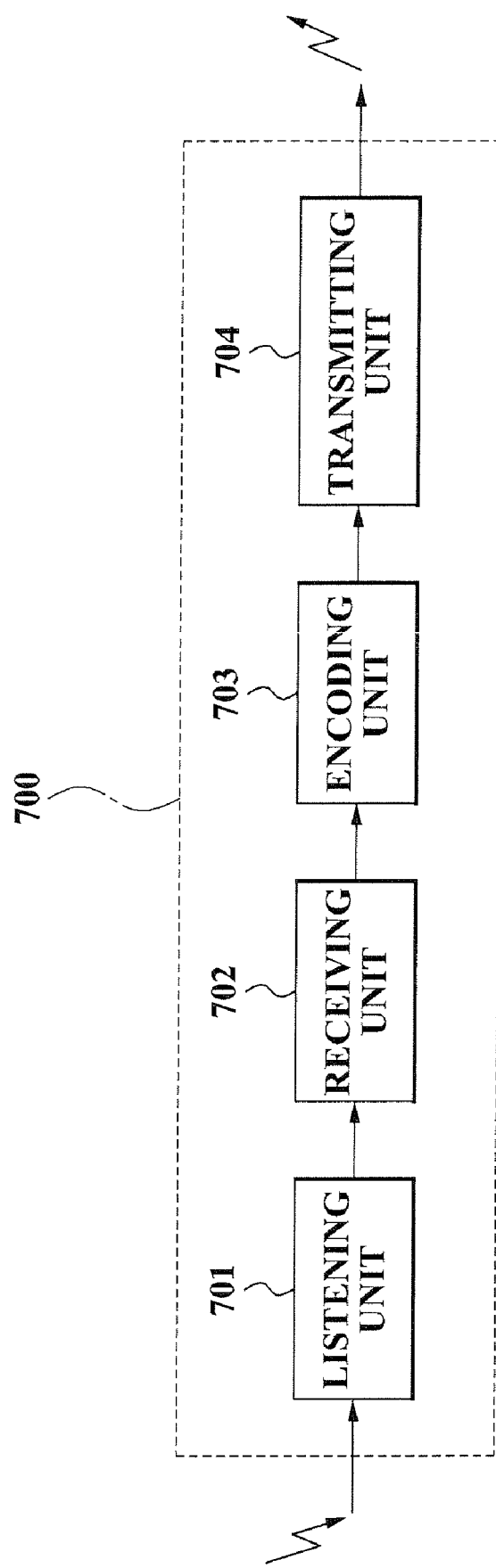
FIG. 7A is a block diagram illustrating a configuration of a base station in a CR environment according to an embodiment of the present invention.

FIG. 7A is a block diagram illustrating a configuration of a base station in a CR environment according to an embodiment of the present invention. Referring to FIG. 7A, a configuration of a CRBS according to an embodiment of the present invention is described. As illustrated in FIG. 7A, a communication apparatus 700 of a CR environment according to an embodiment of the present invention includes a listening unit 701, a receiving unit 702, an encoding unit 703, and a transmitting unit 704. The communication apparatus 700 of the CR environment can be a CRBS, a CPE, and the like.

The listening unit 701 listens to FCH information and/or DL/UL map information of a frame transmitted in a relaying system. The receiving unit 702 obtains a transmission signal of the relaying system using the FCH information and/or the DL/UL map information. The encoding unit 703 orthogonally encodes data to be transmitted in the CR environment based on the obtained transmission signal. Then, the transmitting unit 704 transmits the orthogonally encoded data via a determined channel that is used in the relaying system.

Therefore, according to an embodiment of the present invention, a CR system can easily share radio resource of the relaying system since the CR system can obtain control information and data of a relaying system that has a priority right to use a frequency band without errors, and transmits the data in the CR system using an orthogonal encoding method.

Figure 4:
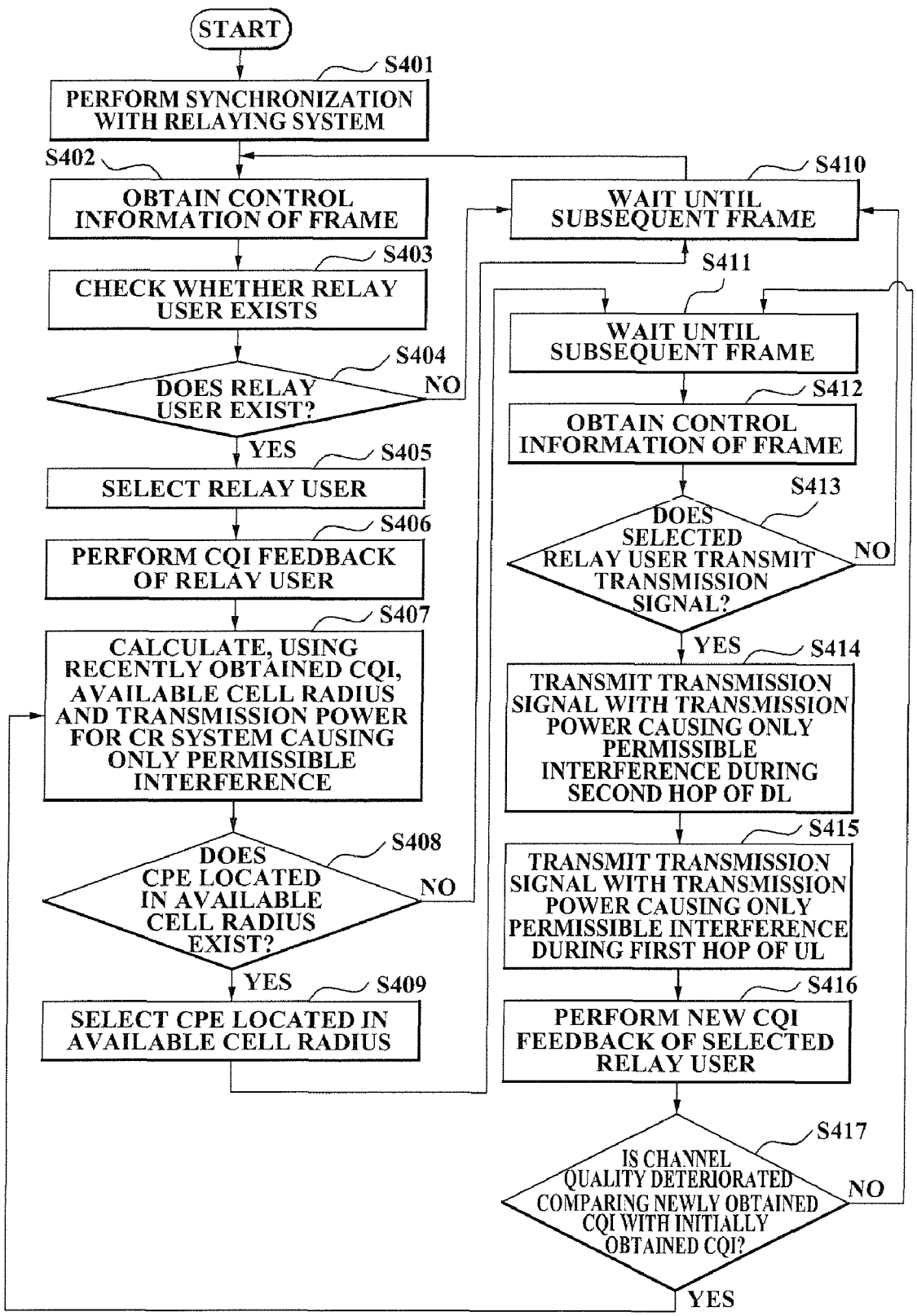
FIG. 4 is a flowchart illustrating a communication method of a CR environment using a relaying system according to another embodiment of the present invention.

FIG. 4 is a flowchart illustrating a communication method of a CR environment using a relaying system according to another embodiment of the present invention. As illustrated in FIG. 4, a CRBS performs synchronization with a relaying system in order to transmit data while sharing radio resources with the relaying system in operation S401. Next, a transmission frame of the relaying system transmitted from a PBS is received and control information is obtained therefrom in operation S402. Using the obtained control information, the CRBS checks whether a relay user, to which data is being transmitted using an RS, exists from among users of a PBS for sharing radio resources in operation S403. Using the checked result (operation S403), it is determined whether the relay user exists in operation S404.

When the relay user does not exist (operation S403), a subsequent frame is used to recheck whether the relay user exists in operation S410. With the subsequent frame, the operations of obtaining control information (operation S402) and checking if the relay user exists therefrom (operation S403) are performed. If it is determined that the relay user does not exist, the operations of using a subsequent frame (operation S410), obtaining control information from the subsequent frame (operation S402), and checking whether the relay user exists (operation S403) are performed again. However, it is understood that according to other aspects, a subsequent frame is not used to recheck if the relay user exists and the method ends when it is determined that the relay user does not exist (operation S404). Conversely, when the relay user exists (operation S404), the relay user is selected in operation S405. After waiting during a DL process of the PBS, CQI of the relay user selected in a UL is obtained in operation S406. The CRBS calculates, using the obtained CQI, a transmission power and a cell radius of a CR system causing only permissible interference to the relay user in operation S407.

The CRBS then determines whether a CPE located in the cell radius exists in operation S408. When a CPE located in the calculated cell radius does not exist (operation S408), the CRBS waits until a subsequent frame in order to select another relay user in operation S410. With the subsequent frame, the CRBS performs the above operations starting from operation S402. However, it is understood that according to other aspects, a subsequent frame is not used to select another relay user and the method ends when it is determined that a CPE located in the calculated cell radius does not exist (operation S408). Conversely, when the CPE located in the calculated cell radius does exist (operation S408), the CPE located in the calculated cell radius is selected in operation S409.

The CRBS waits until a subsequent frame in order to transmit data in operation S411, and obtains control information of the subsequent frame in operation S412. The CRBS determines, using the obtained control information, whether the relay user selected in the previous frame (operation S405) transmits the data of the present frame in the relaying system in operation S413. When the relay user selected in the previous frame (operation S405) does not transmit the data of the present frame (operation S413), the CRBS waits until a subsequent frame in order to select another relay user in operation S410 to perform the above operations starting from operation S402 again. However, it is understood that according to other aspects, a subsequent frame is not used to select another relay user and the method ends when it is determined that the relay user selected in the previous frame (operation S405) does not transmit the data of the present frame (operation S413). Conversely, when the relay user selected in the previous frame also transmits the data of the present frame (operation S413), the CRBS transmits the data to the CPE using a transmission power that causes a permissible interference to the relay user during a second hop of a DL of the relay user in operation S414.

Furthermore, the CPE transmits data to the CRBS using a transmission power that causes a permissible interference to the relay user during a first hop of a UL of the relay user in operation S415. Then, the CRBS performs, from an RS, new CQI feedback of the selected relay user during a second hop of the UL of the relay user in operation S416. The CRBS determines whether a channel quality is deteriorated by comparing the newly obtained CQI of the relay user (operation S416) with the initially obtained CQI of the relay user (operation S406) in operation S417. The cell radius and the transmission power for the CR system that causes only a permissible interference to the relay user are recalculated based on the newly obtained CQI when a channel quality of the relay user is deteriorated (operation S417) in operation S407. Conversely, when a channel quality is identical or is relatively improved (operation S417), the CRBS waits until a subsequent frame in operation S411, and performs the operations again starting from operation S412. However, it is understood that according to other aspects, a subsequent frame is not used and the method ends when the CRBS transmits the data (operation S414) and/or the CPE transmits the data (operation S415).

Figure 5A:
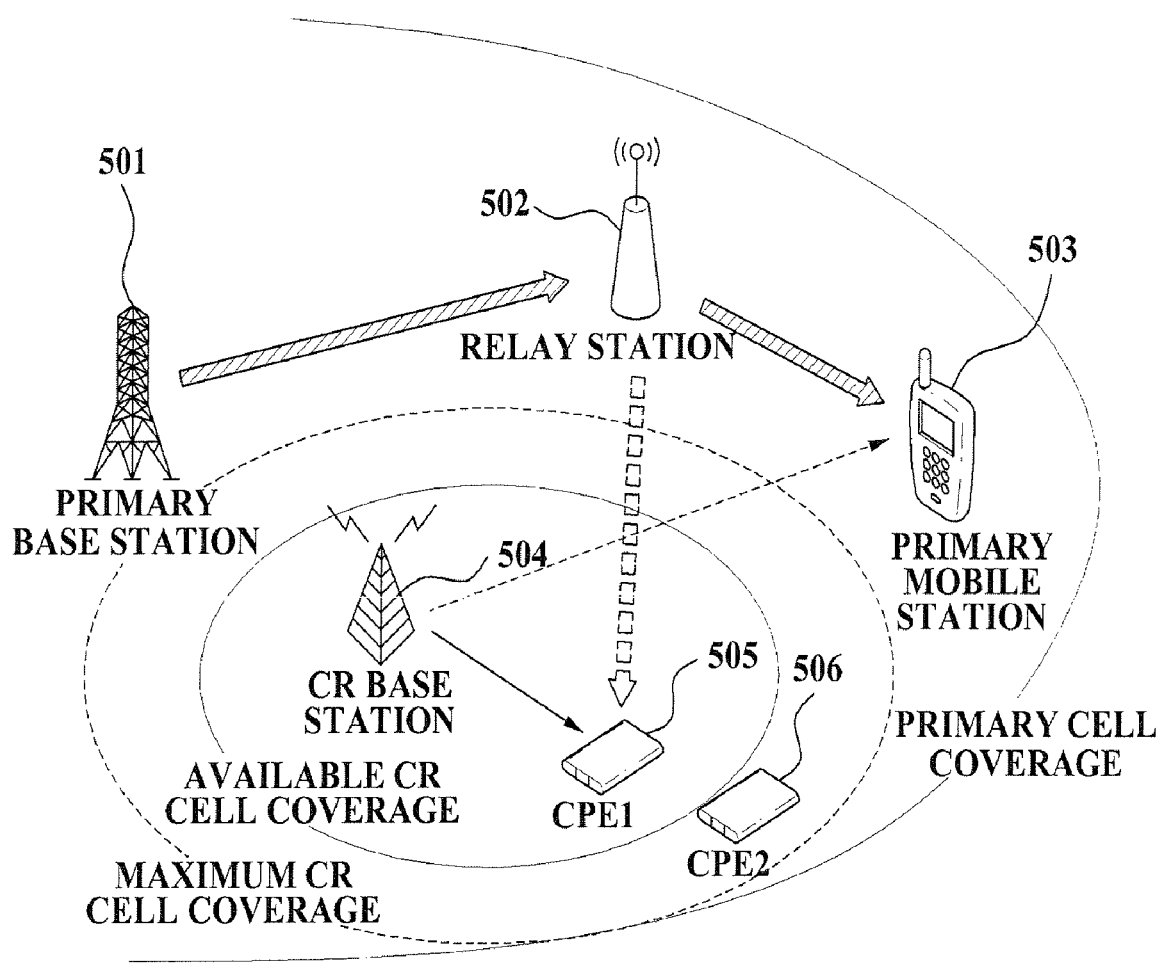
FIG. 5A is a diagram illustrating an apparatus according to another embodiment of the present invention.

FIG. 5A is a diagram illustrating an apparatus according to another embodiment of the present invention. Referring to FIG. 5A, a signal flow in which a CR system shares radio resources of a relaying system during a DL process is described. As illustrated in FIG. 5A, the relaying system includes a PBS 501, an RS 502, and a PMS 503. The CR system includes a CRBS 504 and CPEs 505 and 506.

In order to transmit data sharing radio resources of the CR system, the CRBS 504 receives a frame of the relaying system from the PBS 501 via a wireless channel between the PBS 501 and the CRBS 504 during a first hop in which data of the PBS 501 is transmitted from the PBS 501 to the RS 502. The CRBS 504 checks whether a relay user exists by obtaining control information from the received frame. Also, the CRBS 504 checks a location of DL/UL burst data of the relay user, and a transmission location of CQI using DL/UL map information of the frame. For reference, a user of the relaying system can transmit CQI of the relay user via the RS 502 to the PBS 501. It is understood that in order to remove interference between adjacent cells in the relaying system, a maximum cell radius of the CR system should be less than the cell radius of the relaying system.

The CRBS 504 receives CQI of the relay user via a wireless channel ranging from the RS 502 to the CRBS 504 during a second hop of a UL of the relay user. The CRBS 504 calculates, using the received CQI of the relay user, a cell radius and transmission power for a CR system that causes a permissible interference with the relaying system. Then, the CPE 505 located in the calculated cell radius is selected, and the CRBS 504 waits until a subsequent frame. The CRBS 504 obtains control information of the subsequent frame to check whether the selected relay user is currently transmitting the data. When the selected relay user is currently transmitting the data, the CRBS 504 transmits the data to the CPE 505 using a transmission power causing a permissible interference during a second hop of the relay user via a wireless channel ranging from the CRBS 504 to the CPE 505.

Figure 5B:
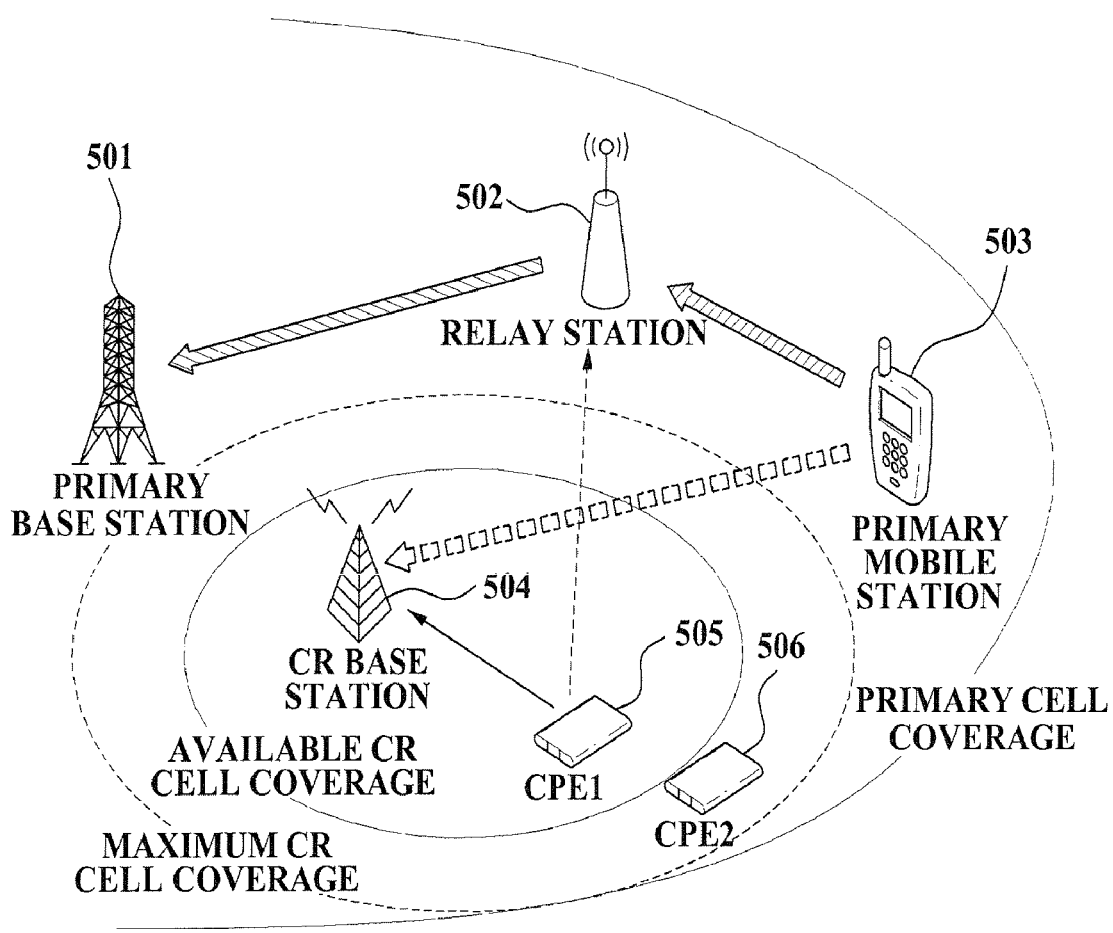
FIG. 5B is a diagram illustrating another apparatus according to another embodiment of the present invention.

FIG. 5B is a diagram illustrating another apparatus according to another embodiment of the present invention. Referring to FIG. 5B, a signal flow in which a CR system shares radio resources of a relaying system during a UL process is described. As illustrated in FIG. 5B, a CPE 505 selected in the above-described FIG. 5A transmits data to the CRBS 504 using a transmission power causing a permissible interference during a first hop of a UL of a relay user via a wireless channel ranging from the CPE 505 to a CRBS 504.

The CRBS 504 then obtains new CQI of the relay user, and compares the new CQI of the relay user to the initially obtained CQI of the relay user. If the channel quality has deteriorated according to the comparison, the transmission power and the cell radius are recalculated using the new CQI.

Figure 6:
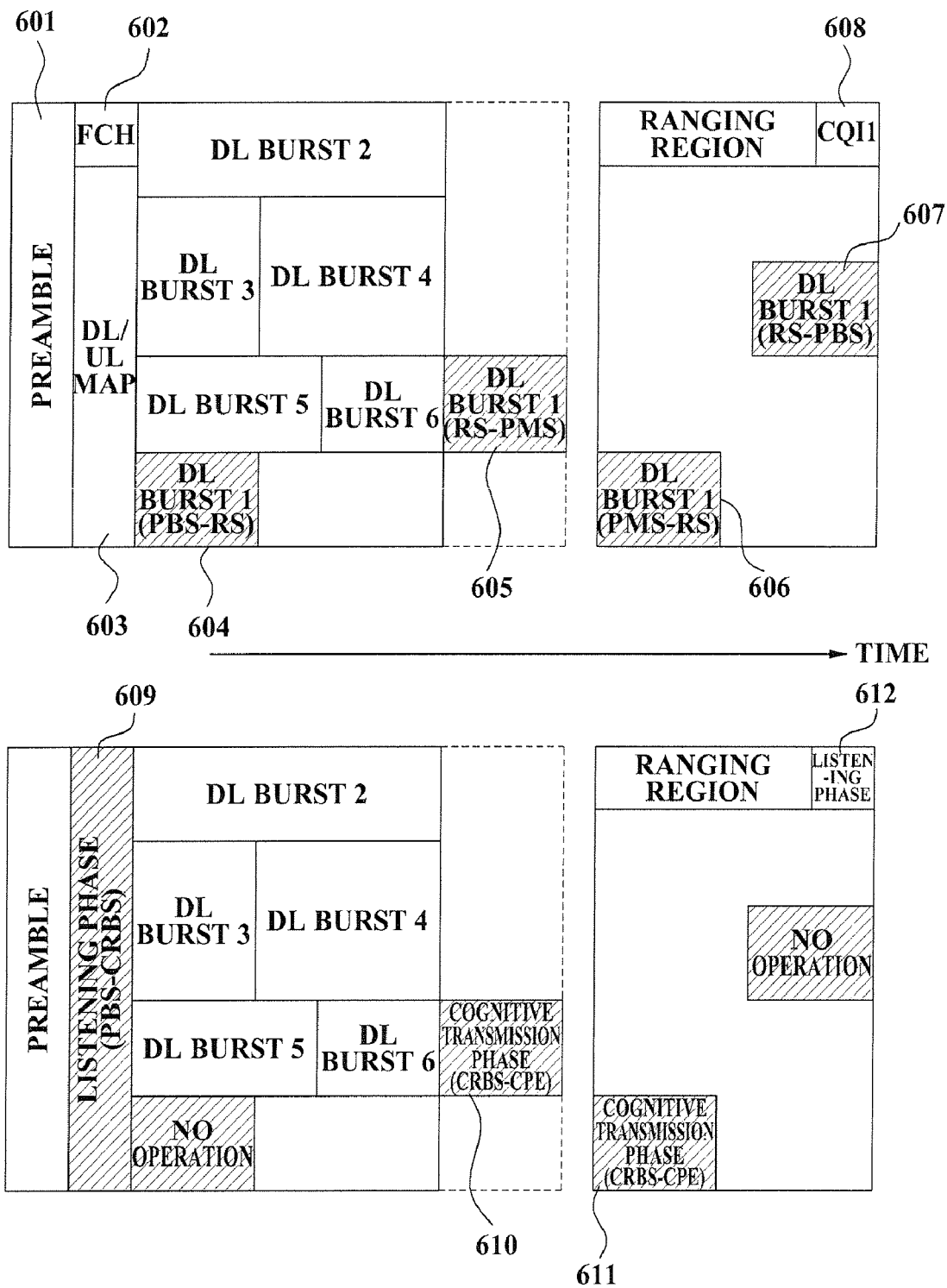
FIG. 6 is a diagram illustrating a structure of a frame according to another embodiment of the present invention.

FIG. 6 is a diagram illustrating a structure of a frame according to another embodiment of the present invention. Referring to FIG. 6, a process in which a frame for each DL/UL link obtains control information and data, and a process in which a frame for each DL/UL link transmits data using orthogonal encoding are described. In particular, a controlling method in an initial frame in order to select a relay user, transmission power of a CR system causing only permissible interference, a cell radius of the CR system, and a CPE in the cell radius are described as follows.

A CRBS performs synchronization with the relaying system using a preamble 601 of the relaying system. Next, the CRBS performs an LP 609 in order to obtain control information (such as FCH information 602, DL/UL map information 603, etc.). The CRBS then checks whether a relay user exists using the obtained control information. When a plurality of relay users exist, any relay user is selected.

The CRBS performs an LP 612 in order to obtain CQI 608 of the selected relay user via a wireless channel between an RS and the CRBS during a second hop of a DL of the relay user. Next, the CRBS uses the CQI to calculate a cell radius and transmission power for a CR system that causes a permissible interference with the relay user. The CRBS selects the CPE located in the calculated cell radius of the CR system, and waits until a subsequent frame.

A controlling method in the subsequent frame after an initial frame according to an embodiment of the present invention is described as follows. First, the CRBS obtains control information (such as FCH 602 and DL/UL map information 603) of the subsequent frame, and checks whether the relay user selected in the initial frame transmits data according to the obtained control information. When the relay user selected in the initial frame is transmitting data in the subsequent frame, a CTP 610 is performed during a second hop of a DL of the relay user in order to transmit data causing only permissible interference.

A process of transmitting UL data of the CPE in the selected CR system is described as follows. The selected CPE performs a CTP 611 during a first hop of a UL of the relay user in order to transmit data causing only permissible interference. Also, the CRBS, which completes DL/UL data transmission with the CPE in the selected CR system, performs an LP 612 in order to obtain new CQI 608 of the selected relay user. The CRBS determines whether a new relay user should be selected and/or whether a new CPE should be selected by comparing the newly obtained CQI 608 of the relay user to the initially obtained CQI of the relay user.

Figure 7B:
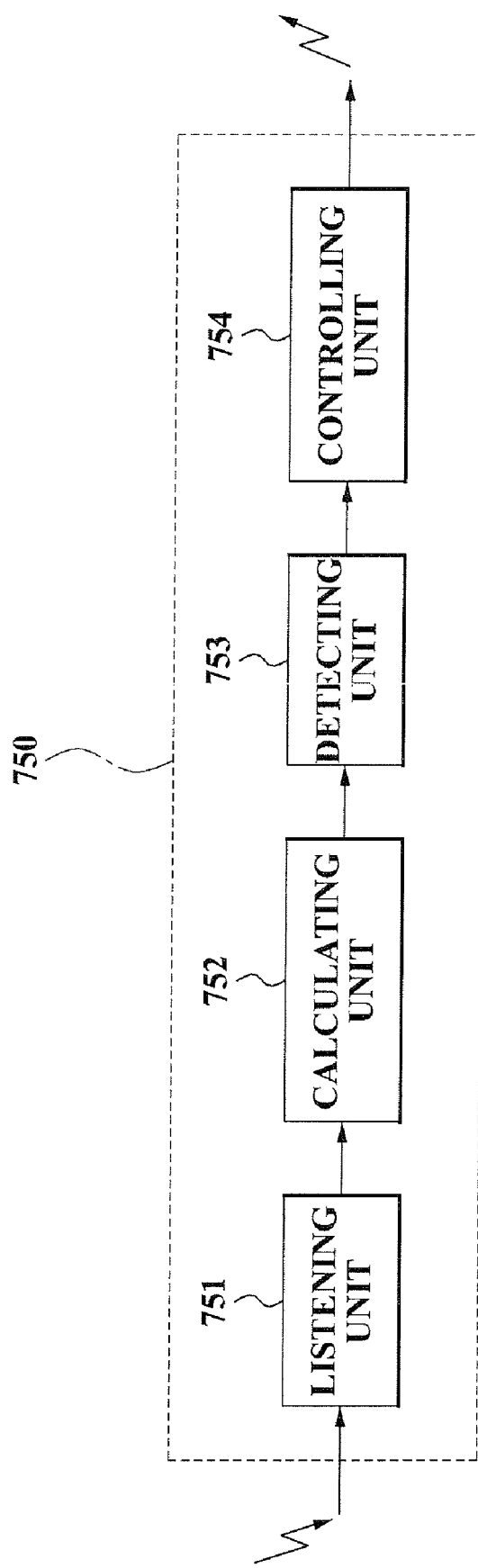
FIG. 7B is a block diagram illustrating a configuration of a base station in a CR environment according to another embodiment of the present invention.

FIG. 7B is a block diagram illustrating a configuration of a base station in a CR environment according to another embodiment of the present invention. Referring to FIG. 7B, a configuration of the CRBS according to another embodiment of the present invention is described. As illustrated in FIG. 7B, a communication apparatus 750 of a CR environment includes a listening unit 751, a calculating unit 752, a detecting unit 753, and a controlling unit 754. The communication apparatus 750 of the CR environment can be a CRBS, a CPE, and the like.

The listening unit 751 listens to FCH information and CQI of a frame transmitted in a relaying system. The calculating unit 752 calculates, using the CQI, a cell radius and transmission power for a CR environment that causes a permissible interference. The detecting unit 753 detects a CPE located in the calculated cell radius. The controlling unit 754 controls a base station of the CR environment to perform a communication with the detected CPE and the calculated transmission power. The controlling unit 754 may include a microcomputer (microcontroller), a central processing unit (CPU), and the like.

Therefore, according to another embodiment of the present invention, there is an advantage that a CR system can obtain control information and CQI of a relaying system having a priority right to use a frequency band without errors, and easily share radio resources of the relaying system by controlling a transmission power range that causes only a permissible interference.

Aspects of the present invention provide a communication method and apparatus of a CR environment using a relaying system with the following and/or other advantages. First, radio resources can be secured such that the radio resources can be used more stably without retrieving many frequency bands in order to locate a usable frequency band in a CR environment. Second, whether a low power incumbent user exits can be easily checked, thereby avoiding an interference phenomenon. Third, radio resources in a relaying system can be shared by obtaining control information of the relaying system instead of a monitoring the radio resources by detecting energy. Fourth, a wireless communication system that is required in a wide area in which a wired communication network cannot be installed can have a greater effect by using a relaying system. Specifically, a CR environment using a relaying system can expand an existing wireless metropolitan area network (WMAN).

Aspects of the present invention can also be embodied as computer-readable codes on a computer-readable recording medium and can be realized in a common digital computer executing the program using a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and a computer data signal embodied in a carrier wave comprising a compression source code segment and an encryption source code segment (such as data transmission through the Internet). The computer-readable recording medium can also be distributed over network coupled computer systems so that the computer-readable code is stored and executed in a distributed fashion. Moreover, the hard disk drive can be used with a computer, can be a portable drive, and/or can be used with a media player.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A communication method of a cognitive radio (CR) environment using a relaying system, the method comprising:
   listening to fundamental channel (FCH) information and/or downlink/uplink (DL/UL) map information of a frame transmitted in the relaying system;
   obtaining a transmission signal of the relaying system using the FCH information and/or the DL/UL map information;
   orthogonally encoding data to be transmitted in the CR environment based on the obtained transmission signal; and
   transmitting the orthogonally encoded data via a determined channel that is used in the relaying system.

2. The method as claimed in claim 1, wherein the listening to the FCH information and/or the DL/UL map information comprises:
   determining whether a relay user exists using the FCH information of the frame; and
   listening to the DL/UL map information when the relay user exists.

3. The method as claimed in claim 2, further comprising:
   when the relay user does not exist, repeatedly obtaining a subsequent frame until the relay user does exist.

4. The method as claimed in claim 1, wherein the obtaining of the transmission signal comprises:
   obtaining the transmission signal during a first hop of either an uplink transmission or a downlink transmission in the relaying system.

5. The method as claimed in claim 1, wherein the orthogonal encoding of the data comprises:
   orthogonally encoding the data during a first hop of either an uplink transmission or a downlink transmission in the relaying system.

6. The method as claimed in claim 1, wherein the transmitting of the orthogonally encoded data comprises:
   transmitting the orthogonally encoded data during a second hop, after a first hop, of either an uplink transmission or a downlink transmission in the relaying system.

7. The method as claimed in claim 1, further comprising:
   synchronizing with the relaying system before the listening to the FCH information and/or DL/UL map information.

8. The method as claimed in claim 1, wherein the transmission signal includes uplink burst data and/or downlink burst data.

9. The method as claimed in claim 1, wherein the orthogonal encoding of the data comprises:
   encoding the data based on a channel encoding method of burst data of the relaying system.

10. A communication apparatus of a cognitive radio (CR) environment using a relaying system, the apparatus comprising:
    a listening unit to listen to fundamental channel (FCH) information and/or downlink/uplink (DL/UL) map information of a frame transmitted in the relaying system;
    a receiving unit to obtain a transmission signal of the relaying system using the FCH information and/or the DL/UL map information;
    an encoding unit to orthogonally encode data to be transmitted in the CR environment based on the obtained transmission signal; and
    a transmitting unit to transmit the orthogonally encoded data via a determined channel that is used in the relaying system.

11. The apparatus as claimed in claim 10, wherein the listening unit determines whether a relay user exists using the FCH information of the frame, and listens to the DL/UL map information when the relay user exists.

12. The apparatus as claimed in claim 10, wherein the receiving unit obtains the transmission signal during a first hop of either an uplink transmission or a downlink transmission in the relaying system.

13. The apparatus as claimed in claim 10, wherein the encoding unit orthogonally encodes the data during a first hop of either an uplink transmission or a downlink transmission in the relaying system.

14. The apparatus as claimed in claim 10, wherein the transmitting unit transmits the orthogonally encoded data during a second hop, after a first hop, of either an uplink transmission or a downlink transmission in the relaying system.

15. A communication method of a cognitive radio (CR) environment using a relaying system, the method comprising:
    obtaining control information of a frame transmitted in the relaying system; and
    modifying and/or transmitting data of the CR environment via a predetermined channel that is used in the relaying system according to the control information of the frame.

16. The method as claimed in claim 15, wherein the obtaining of the control information comprises:
    listening to fundamental channel (FCH) information and/or downlink/uplink (DL/UL) map information of the frame;
    determining whether a relay user exists using the FCH information of the frame; and
    listening to the DL/UL map information when the relay user exists.

17. The method as claimed in claim 15, further comprising:
    obtaining a transmission signal of the relaying system using the control information.

18. The method as claimed in claim 17, wherein the obtaining of the transmission signal comprises:
   obtaining the transmission signal during a first hop of either an uplink transmission or a downlink transmission in the relaying system.

19. The method as claimed in claim 17, wherein the modifying and/or transmitting of the data comprises:
   orthogonally encoding the data based on the obtained transmission signal; and
   transmitting the orthogonally encoded data via the determined channel that is used in the relaying system.

20. The method as claimed in claim 17, wherein the transmission signal includes uplink burst data and/or downlink burst data.

21. The method as claimed in claim 15, wherein the obtaining of the control information comprises:
   listening to FCH information and channel quality information (CQI) of the frame.

22. The method as claimed in claim 21, wherein the obtaining of the control information further comprises:
   determining whether a relay user exists using the FCH information of the frame; and
   listening to the CQI when the relay user exists.

23. The method as claimed in claim 21, wherein the modifying and/or transmitting of the data comprises:
   calculating, using the CQI, a cell radius and transmission power for the CR environment such that the CR environment causes only an acceptable interference in the relaying system;
   detecting a customer premises equipment (CPE) located in the calculated cell radius; and
   controlling a base station of the CR environment to perform a communication with the detected CPE using the calculated transmission power.

24. The method as claimed in claim 23, wherein the controlling of the base station to perform the communication comprises:
   obtaining FCH information and CQI of a subsequent frame;
   determining whether a relay user of the frame and a relay user of the subsequent frame are identical according to the FCH information of the frame and the FCH information of the subsequent frame.

25. The method as claimed in claim 24, wherein the controlling of the base station to perform the communication further comprises:
   comparing the CQI from the frame to the CQI from the subsequent frame when the relay user of the frame and the relay user of the subsequent frame are identical; and
   recalculating the cell radius and the transmission power for the CR environment such that the CR environment causes only the acceptable interference in the relaying system when the CQI from the subsequent frame is lower than the CQI from the frame.

26. The method as claimed in claim 25, wherein the controlling of the base station to perform the communication further comprises:
   using the calculated cell radius and the transmission power for the CR environment without recalculating the cell radius and the transmission power for the CR environment when the CQI from the subsequent frame is identical to or is higher than the CQI from the frame.

27. A communication apparatus of a cognitive radio (CR) environment using a relaying system, the apparatus comprising:
   a listening unit to obtain control information of a frame transmitted in the relaying system;
   a receiving unit to obtain a transmission signal of the relaying system using the control information; and
   an encoding unit to orthogonally encode data to be transmitted in the CR environment based on the obtained transmission signal.

28. The apparatus as claimed in claim 27, further comprising:
   a transmitting unit to transmit the orthogonally encoded data via a determined channel that is used in the relaying system.

29. The apparatus as claimed in claim 27, wherein the control information comprises:
   fundamental channel (FCH) information and/or downlink/uplink (DL/UL) map information.

30. The apparatus as claimed in claim 29, wherein the listening unit determines whether a relay user exists using the FCH information of the frame, and listens to the DL/UL map information when the relay user exists.

31. The apparatus as claimed in claim 27, wherein the receiving unit obtains the transmission signal during a first hop of either an uplink transmission or a downlink transmission in the relaying system.

32. The apparatus as claimed in claim 27, wherein the encoding unit orthogonally encodes the data during a first hop of either an uplink transmission or a downlink transmission in the relaying system.

33. The apparatus as claimed in claim 27, wherein the transmitting unit transmits the orthogonally encoded data during a second hop, after a first hop, of either an uplink transmission or a downlink transmission in the relaying system.

34. The apparatus as claimed in claim 27, wherein the communication apparatus of the CR environment is a base station of the CR environment.

35. The apparatus as claimed in claim 27, wherein the communication apparatus of the CR environment is a terminal of the CR environment.

36. A non-transitory computer readable medium encoded with the method of claim 15 implemented by a computer.

* * * * *